US011877110B2

(12) United States Patent
Bacon et al.

(10) Patent No.: US 11,877,110 B2
(45) Date of Patent: Jan. 16, 2024

(54) FLOW RELIEF FEATURES EMBEDDED IN COSMETIC SURFACE OF WEARABLES

(71) Applicant: BOSE CORPORATION, Framingham, MA (US)

(72) Inventors: Cedrik Bacon, Ashland, MA (US); Sean Patterson, Allston, MA (US); Donna Marie Sullivan, Millbury, MA (US); Richmond Andrew Real, Uxbridge, MA (US); Christopher Ratcliffe, Williamsburg, VA (US)

(73) Assignee: BOSE CORPORATION, Framingham, MA (US)

( * ) Notice: Subject to any disclaimer, the term of this patent is extended or adjusted under 35 U.S.C. 154(b) by 203 days.

(21) Appl. No.: 17/574,793

(22) Filed: Jan. 13, 2022

(65) Prior Publication Data

US 2023/0224618 A1 Jul. 13, 2023

(51) Int. Cl.
*H04R 1/10* (2006.01)

(52) U.S. Cl.
CPC ........ *H04R 1/1016* (2013.01); *H04R 2460/11* (2013.01)

(58) Field of Classification Search
CPC ............ H04R 1/1016; H04R 2225/025; H04R 2225/77; H04R 2460/09; H04R 2460/11; H04R 1/2803; H04R 1/2811; H04R 1/2826; H04R 1/2849; H04R 25/48
See application file for complete search history.

(56) References Cited

U.S. PATENT DOCUMENTS

| | | | | |
|---|---|---|---|---|
| 5,659,156 | A * | 8/1997 | Mauney | H04R 1/1016 381/328 |
| 9,473,845 | B2 * | 10/2016 | Weil | G10K 11/17881 |
| 9,774,962 | B2 * | 9/2017 | Karamuk | H04R 25/658 |
| 9,782,584 | B2 * | 10/2017 | Cartledge | A61N 1/36036 |
| 10,334,375 | B2 * | 6/2019 | Naether | H04R 25/658 |
| 10,785,553 | B2 * | 9/2020 | Sang | H04R 1/086 |
| 11,095,968 | B2 * | 8/2021 | Birch | H04R 1/1041 |
| 11,218,794 | B2 * | 1/2022 | Bai | H04R 1/1058 |

(Continued)

FOREIGN PATENT DOCUMENTS

| | | | | |
|---|---|---|---|---|
| EP | 2456228 | A1 * | 5/2012 | H04R 1/1091 |
| JP | 2015195444 | A * | 11/2015 | |

(Continued)

OTHER PUBLICATIONS

International Search Report and Written Opinion for International Application No. PCT/US2023/010776 dated Jul. 14, 2023.

(Continued)

*Primary Examiner* — Ryan Robinson
(74) *Attorney, Agent, or Firm* — Patterson + Sheridan, LLP

(57) ABSTRACT

Aspects describe air flow relief features in the cosmetic surface of the housing of an in-ear audio output device. Due to design constraints based, at least in part, on the limited space available in the acoustic chamber and ear geometry, ports coupling the acoustic chamber with an area outside the housing are susceptible to full blockage when placed in-ear. Air flow relief channels for ports, extending from the port aligned in the concha cymba, over the helix crus, to the cymba cavum minimize complete blockages of the port as compared to current designs.

20 Claims, 8 Drawing Sheets

(56) References Cited

U.S. PATENT DOCUMENTS

| | | | | |
|---|---|---|---|---|
| 11,240,581 | B2 * | 2/2022 | Sampei | H04R 1/1091 |
| 2015/0110320 | A1 | 4/2015 | Liu et al. | |
| 2016/0261942 | A1 | 9/2016 | Hayden | |
| 2017/0339481 | A1 * | 11/2017 | Laberge | H04R 1/1016 |
| 2018/0310089 | A1 | 10/2018 | Yun | |
| 2021/0377640 | A1 | 12/2021 | Zalisk et al. | |
| 2022/0167078 | A1 * | 5/2022 | Hung | H04R 1/1016 |
| 2022/0225015 | A1 * | 7/2022 | Wu | H04R 1/1033 |
| 2022/0377477 | A1 * | 11/2022 | Tsuge | H04R 25/02 |
| 2022/0386041 | A1 * | 12/2022 | Knudsen | H04R 25/48 |
| 2023/0133906 | A1 * | 5/2023 | Kamimura | H04R 1/1016<br>381/328 |

FOREIGN PATENT DOCUMENTS

| | | | | |
|---|---|---|---|---|
| JP | 2015195444 | A | 11/2015 | |
| WO | 2022000003 | A1 | 1/2022 | |
| WO | WO-2022042747 | A1 * | 3/2022 | H04R 1/08 |

OTHER PUBLICATIONS

Invitation to Pay Additional Fees for International Application No. PCT/US2023/010776 dated May 9, 2023.

* cited by examiner

FLOW RELIEF FEATURES EMBEDDED IN COSMETIC SURFACE OF WEARABLES

FIELD

Aspects of the present disclosure describe air flow relief features of an in-ear audio output device having one or more ports. As described in more detail herein, the air flow relief is designed to provide an air flow path to prevent complete blockage of a port while maintaining the overall cosmetic design of the housing.

BACKGROUND

Various in-ear audio output devices (referred to herein as "audio devices") incorporate active noise reduction (ANR) features, also known as active noise control or cancellation (ANC), in which one or more microphones detect sound, such as exterior acoustics captured by a feedforward microphone or interior acoustics captured by a feedback microphone. Signals from a feedforward microphone and/or a feedback microphone are processed to provide anti-noise signals to be fed to an acoustic transducer (e.g., a speaker, a driver) to counteract noise that may otherwise be heard by a user.

Such audio devices may also have small vent holes, namely acoustic ports, on the outside cosmetic surface of the housing. The ports may be used to improve acoustic output of the audio device, equalize the audio response, and provide a venting path during overpressure events for the acoustic transducer. The likelihood of interference to such ports continues to increase as audio devices reduce in size.

SUMMARY

Aspects provide an in-ear audio output device. In an aspect, the in-ear audio output device comprises: an acoustic chamber defined by an earbud housing shaped to fit in a concha of an ear of a wearer of the in-ear audio output device. The earbud housing comprises: a first port configured to be aligned with a concha cymba of the wearer when the device is worn; and a first air flow channel extending from an area surrounding the first port to a portion of the earbud housing shaped to fit in a concha cavum of the wearer when the device is worn.

In aspects, the first air flow channel comprises a geometric stadium shape. In aspects, the first air flow channel is shaped to cross a helix crus of the ear when the device is worn. In aspects, the first air flow channel has a continuous depth relative to an outer surface of the earbud housing.

In aspects, the first port comprises a sound port and a feedforward microphone disposed in the sound port.

In aspects, in-ear audio output device further comprises a second port configured to be aligned with the concha cymba of the wearer when the device is worn, and a second air flow channel extending from an area surrounding the second port to a portion of the earbud housing shaped to fit in the concha cavum of the wearer when the device is worn. In aspects, the second air flow channel comprises a geometric stadium shape. In aspects, the in-ear audio output device of claim 6, wherein the second air flow channel is shaped to cross a helix crus of the ear when the device is worn. In aspects, the second air flow channel has a continuous depth relative to an outer surface of the earbud housing.

In aspects, the second port comprises a mass port.

In aspects, the first air flow channel and the second air flow channel are substantially parallel.

Aspects provide an in-ear audio output device, comprising an acoustic chamber defined by an earbud housing shaped to fit in a concha of an ear of a wearer of the in-ear audio output device, the earbud housing comprising: a feedforward microphone disposed in a sound port, the sound port configured to be aligned with a concha cymba of the wearer when the device is worn; a mass port configured to be aligned with the concha cymba of the wearer when the device is worn; and a first air flow channel extending from a first portion of the housing surrounding the sound port to a second portion of the housing, the second portion of the housing being deeper within the ear and closer to an ear canal opening of the ear as compared to the first portion of the earbud housing.

In aspects, to extend from the first portion of the housing to the second portion of the housing, the first air flow channel is configured to cross over a helix crus of the ear when the device is worn.

In aspects, the second portion of the housing is shaped to fit in a concha cavum of the concha.

In aspects, the in-ear audio output device further comprises a second air flow channel extending from the first portion of the earbud housing surrounding the mass port to the second portion of the housing.

In aspects, to extend from the first portion of the housing to the second portion of the housing, the second air flow channel is configured to cross over a helix crus of the ear when the device is worn.

In aspects, the first air flow channel and the second air flow channel each comprise a geometric stadium shape.

In aspects, at least one of the first air flow channel or the second air flow channel has a continuous depth relative to an outer surface of the earbud housing.

In aspects, in-ear audio output device further comprises a resistive port configured to be aligned with an intertragal notch of the ear when the device is worn. In aspects, the resistive port creates an opening in a surface of the earbud housing to couple the acoustic chamber with a space outside of the earbud housing.

All examples and features mentioned herein can be combined in any technically possible manner. Other features, objects, and advantages will become apparent from the following detailed description, when read in connection with the following drawing.

DETAILED DESCRIPTION

Figure 1:
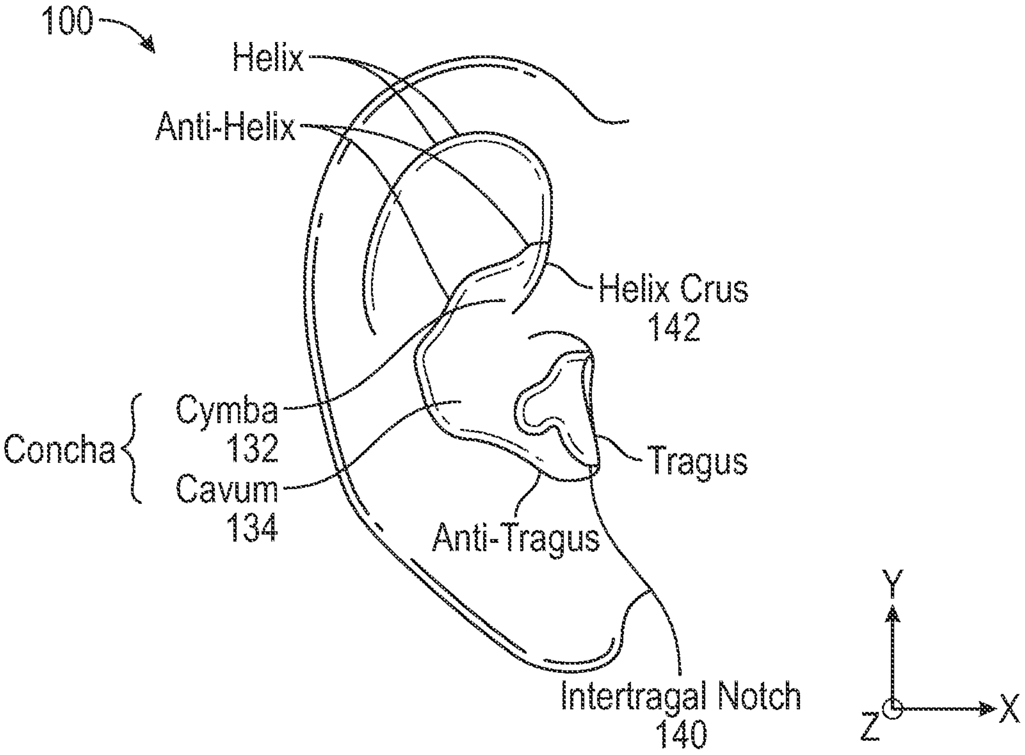
FIG. 1 is a view of the lateral surface of the human ear.

In-ear audio output devices use drivers (e.g., acoustic transducers, speakers) to convert electrical signals into sound. One basic type of driver comprises a coil of wire, called a voice coil, attached to the apex of a cone or dome-shaped diaphragm. The voice coil is positioned in a permanent magnetic field, created, for example, by a pair of permanent magnets. Electrical current is passed through the voice coil, turning the voice coil into an electromagnet. The force generated by the fields of the electromagnet and the permanent magnet moves the voice coil back and forth, which in turn moves the diaphragm. The movement of the diaphragm creates longitudinal pressure waves in the air, which are perceived by human ears and brain as sound.

The sound quality that is produced is highly dependent on the design of its driver(s), and more specifically, on the driver's ability to move air. In general, the easier it is for the driver to move back and forth, the more air the driver can move. This is especially important at lower frequencies (perceived as bass), which require more extreme movements of the driver.

To make it easier for the speaker to move, audio devices are designed to have small vent holes or acoustic ports to couple the acoustic chamber (housing the driver) to an area outside the device. The acoustic ports allow air to move in behind the driver when the driver pushes air towards the ear, and allow air to move back out when the driver moves away from the ear. By making it easier for the speaker to move, the ports improve sound quality. Further, by allowing air to flow in and out of the driver, the acoustic ports help to prevent pressure from building up, thereby allowing the driver to move more freely. Additionally, the acoustic ports help to equalize the audio response and help support noise cancellation features.

Due to the small size of the ports and size constraints of wearable audio output devices, ports are easily susceptible to blockage. For example, when the device is placed in a wearer's ear, ports may be unintentionally obstructed given the geometry of the wearer's ear, thereby preventing air from flowing in and out of the audio device. When a port becomes blocked, the acoustic response of the audio device may deviate significantly from what is expected. The audio device may not be designed to compensate for such deviation; thus, the blocked port may create unstable conditions, and in some cases, result in a feedback-like squealing sound.

Accordingly, aspects of the present disclosure provide an in-ear audio output device having at least one air flow relief feature on an earbud housing to prevent a port from becoming completely blocked. As used herein, a port is an opening in the wall of the housing that couples the acoustic chamber to a space outside the earbud housing.

The air flow feature (air flow relief feature) surrounds the port and provides an air flow channel (air flow relief channel) between the earbud housing and the concha. When the device is worn, the port is aligned with the wearer's concha cymba. The air flow channel of the housing extends from the port to a portion of the housing that is aligned with the concha cavum. In other words, the air flow channel spans multiple planes. As such, when the device is worn, a portion of the air flow channel (aligned with the concha cavum) is deeper in the user's ear, and closer to ear canal, as compared to the portion of the air flow channel that is more proximate to the port (and aligned with the concha cymba). The air flow feature of the present disclosure makes blockage of the port highly unlikely given the location and shape of the air flow channel in combination with ear geometry.

FIG. 1 shows the lateral surface of a human's right ear 100, with some features identified. There are many different ear sizes and geometries and include features not illustrated in FIG. 1

Figure 2:
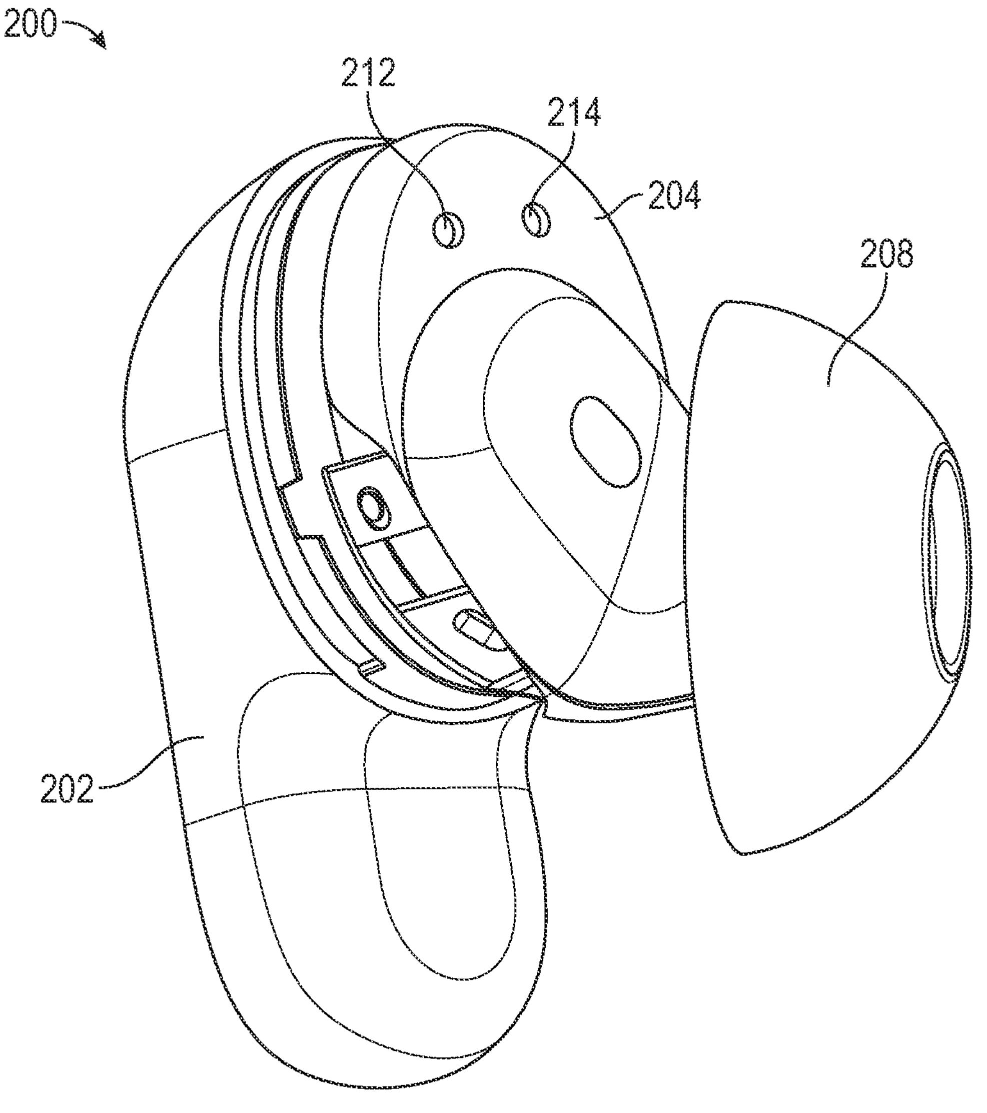
FIG. 2 is a side perspective of an in-ear audio output device including an earbud housing having acoustic ports, according to aspects of the present disclosure.

FIG. 2 is a side perspective of an in-ear wearable audio output device (device) 200 including an earbud housing having multiple ports. The device includes a body 202, an earbud housing 204, a nozzle (206, not visible in FIG. 2), and a sealing structure 208. In aspects, earbud housing 204 is shaped to extend toward and fit in the concha cavum 134. Earbud housing 204 defines an acoustic chamber which houses the acoustic driver and other electronics for the device. A view of the device with the housing removed, exposing the acoustic chamber, is provided in FIG. 4.

In aspects, earbud housing 204 includes a port 214 for a feedforward microphone (feedforward microphone port), a mass port 212, and a resistive port 210. The feedforward microphone port 214 enables a feedforward microphone disposed in the port 214 to be coupled to an area outside of the acoustic chamber. The provision of one or both of the mass port 212 and the resistive port 210 enhance characteristics of the acoustic output of sounds by the acoustic driver. As illustrated in FIG. 2, in aspects, the feedforward microphone port 214 and mass port 212 are configured to be aligned with the concha cymba 132 and the resistive port 210 sits in the wearer's concha cavum 134 and is aligned with the wearer's intertragal notch 140. The openings on the housing 204 of the feedforward microphone port 214 and mass port 212 are substantially flush with the surrounding surface of the housing 204.

The body 202 is coupled to an external surface of earbud housing 204 extending away from an ear canal of the wearer. In aspects, the body 202 is shaped like a rectangular pill and is situated outside the wearer's ear when the device is worn. In aspects, body 202 sits against the outside of the wearer's ear, and in some cases, the wearer's face, to help hold device 200 in place. While not visible in FIG. 2, in aspects, the body 202 may include a port 226 for a second feedforward microphone (see FIG. 3).

Figure 8:
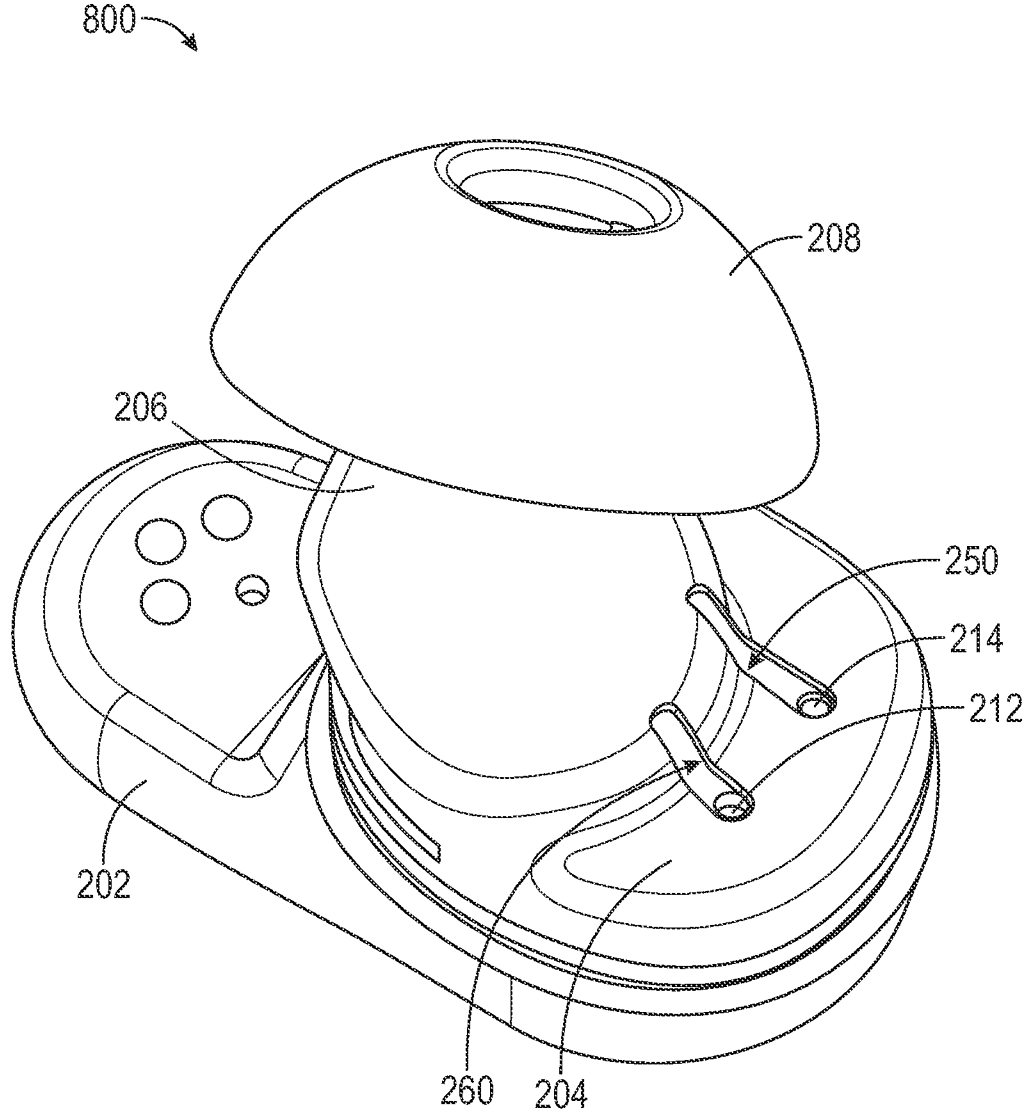
FIG. 8 is an in-ear audio output device having air flow relief features, according to aspects of the present disclosure.

The nozzle (206 not visible in FIG. 2, shown in FIG. 8) extends from earbud housing 204 towards sealing structure 208. In aspects, earbud housing 204 extends into nozzle 206 or, in other words, forms part of nozzle 206. The nozzle provides an acoustic passage for sound waves to pass to the ear canal of the wearer. In aspects, nozzle has a planar end with a substantially elliptical-shaped opening.

Sealing structure 208 creates a seal with a wearer's ear canal. Sealing structure 208 is substantially spherically-dome shaped. Sealing structure 208 extends from the planar end of nozzle 206 and folds back towards the wearer's outer ear.

Figure 3:
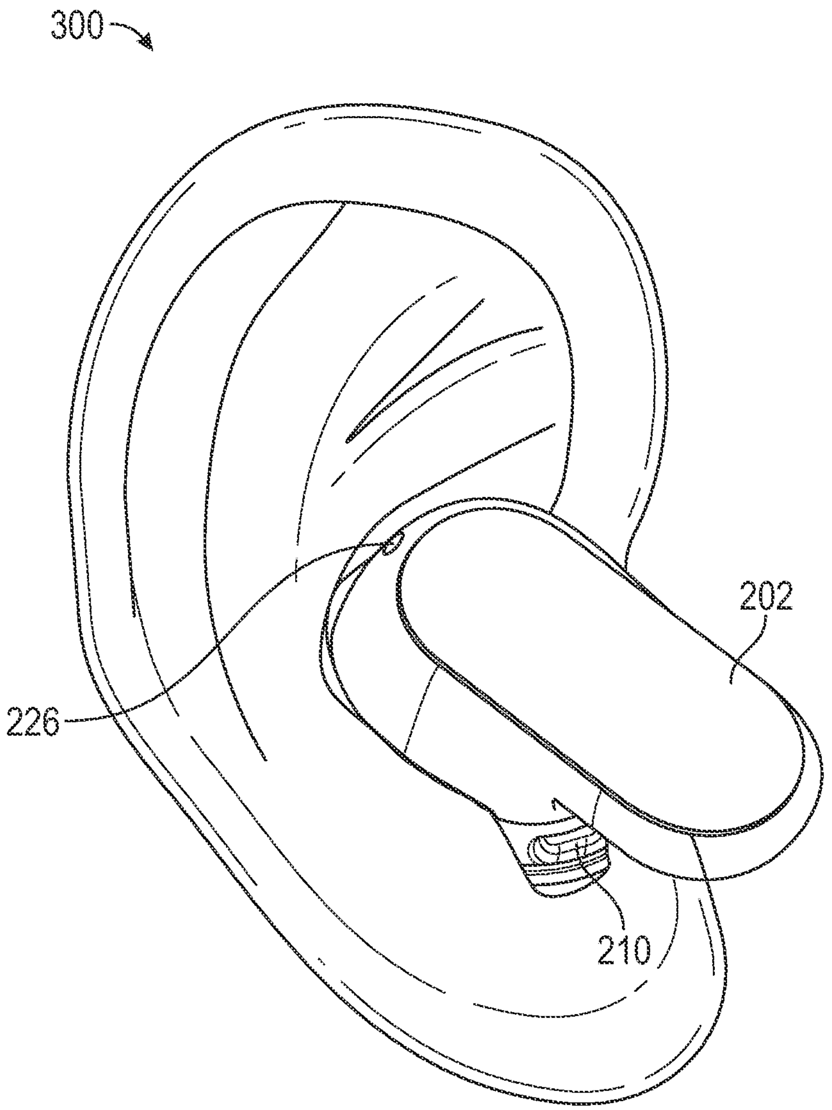
FIG. 3 is a back perspective of the in-ear audio output device including the earbud housing having acoustic ports positioned in a wearer's ear, according to aspects of the present disclosure.

FIG. 3 is a back perspective of the device positioned in a wearer's ear 300, according to aspects of the present disclosure. As illustrated in FIG. 3, when the device is inserted in the wearer's ear, resistive port 210 is aligned with the intertragal notch of the ear. The port 226 for the second feedforward microphone may be situated outside the wearer's ear when the device is positioned in the wearer's ear.

The ports 212 and 214 are not visible in FIG. 3 when the device is positioned in the ear, as they are aligned with the wearer's concha cymba 132. Given the fit of the device in the ear, there are times when one or more ports are blocked by being pressed up and in contact with the concha cymba 132. For example, ports 212, 214 may be blocked when a side sleeper, wearing the device, places their head on a pillow. In another example, a winter cap may press on the body 202 of the device and cause blockage of the feedforward microphone port 214 and/or mass port 212. In some instances, the wearer commands actions of the device by pressing on the outside surface of device resulting in an unintended blockage.

As described above, it is desirable to prevent a full blockage of ports.

Figure 4:
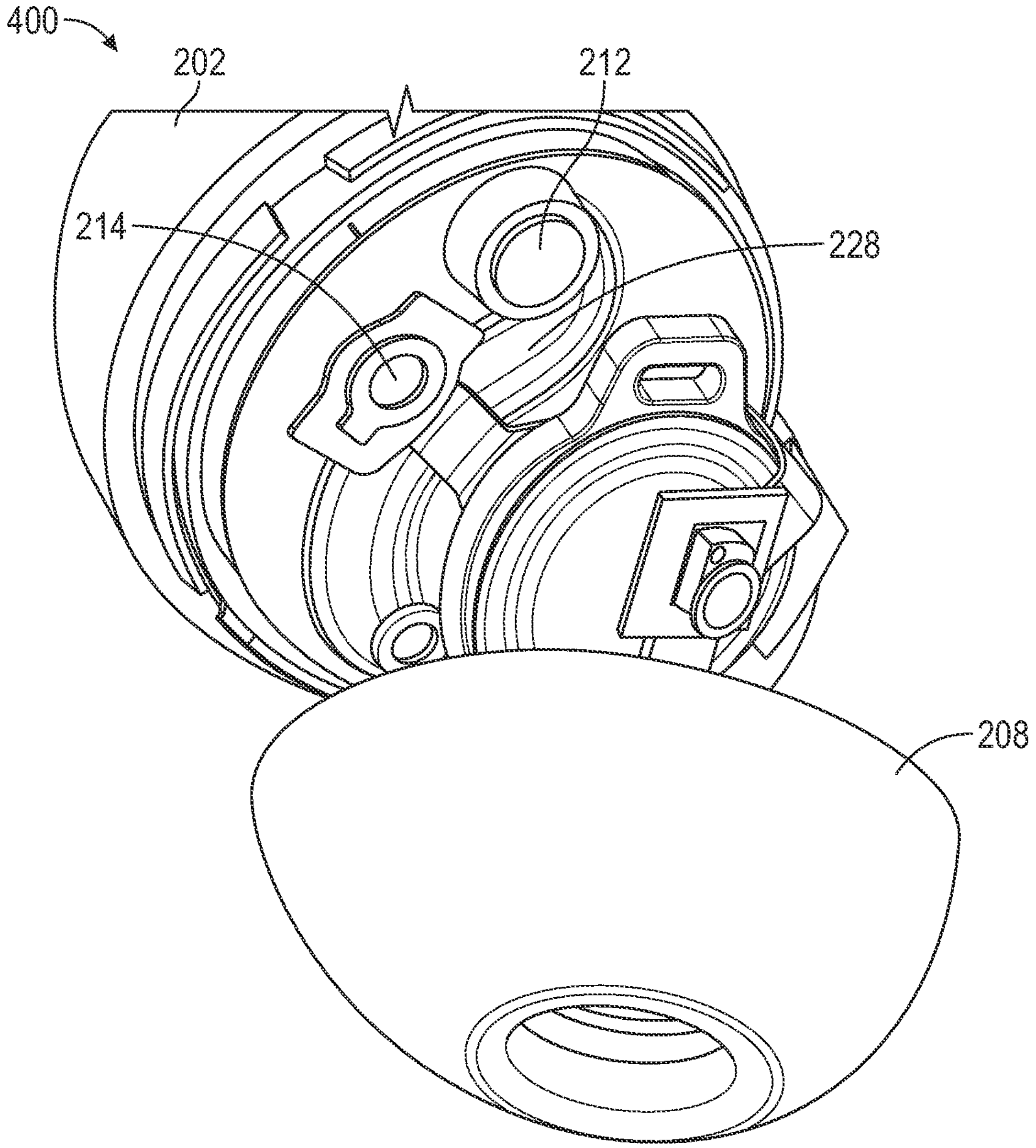
FIG. 4 is a view inside the acoustic chamber, according to aspects of the present disclosure.
Figure 5:
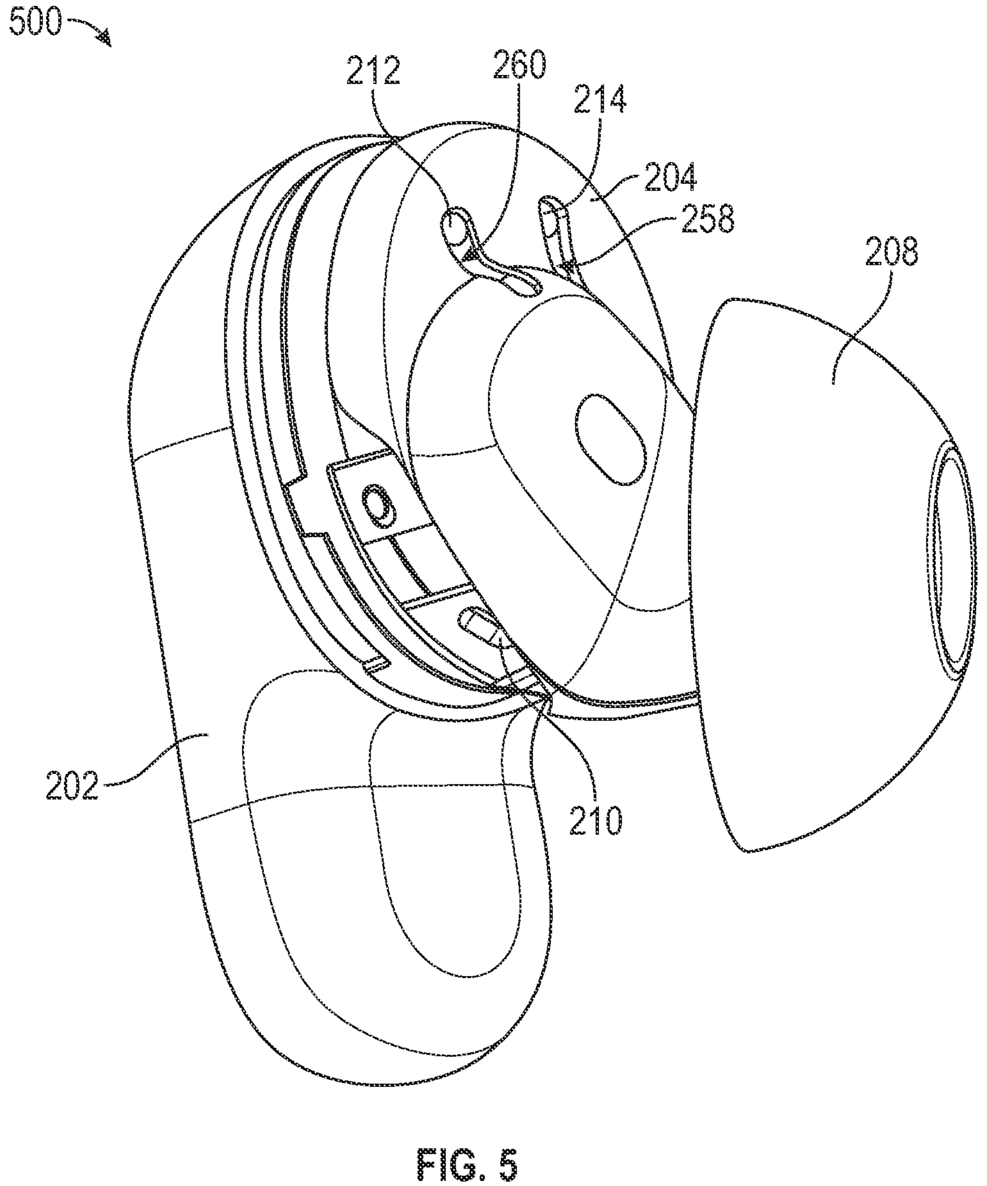
FIG. 5 is an in-ear audio output device having air flow relief features, according to aspects of the present disclosure.
Figure 6:
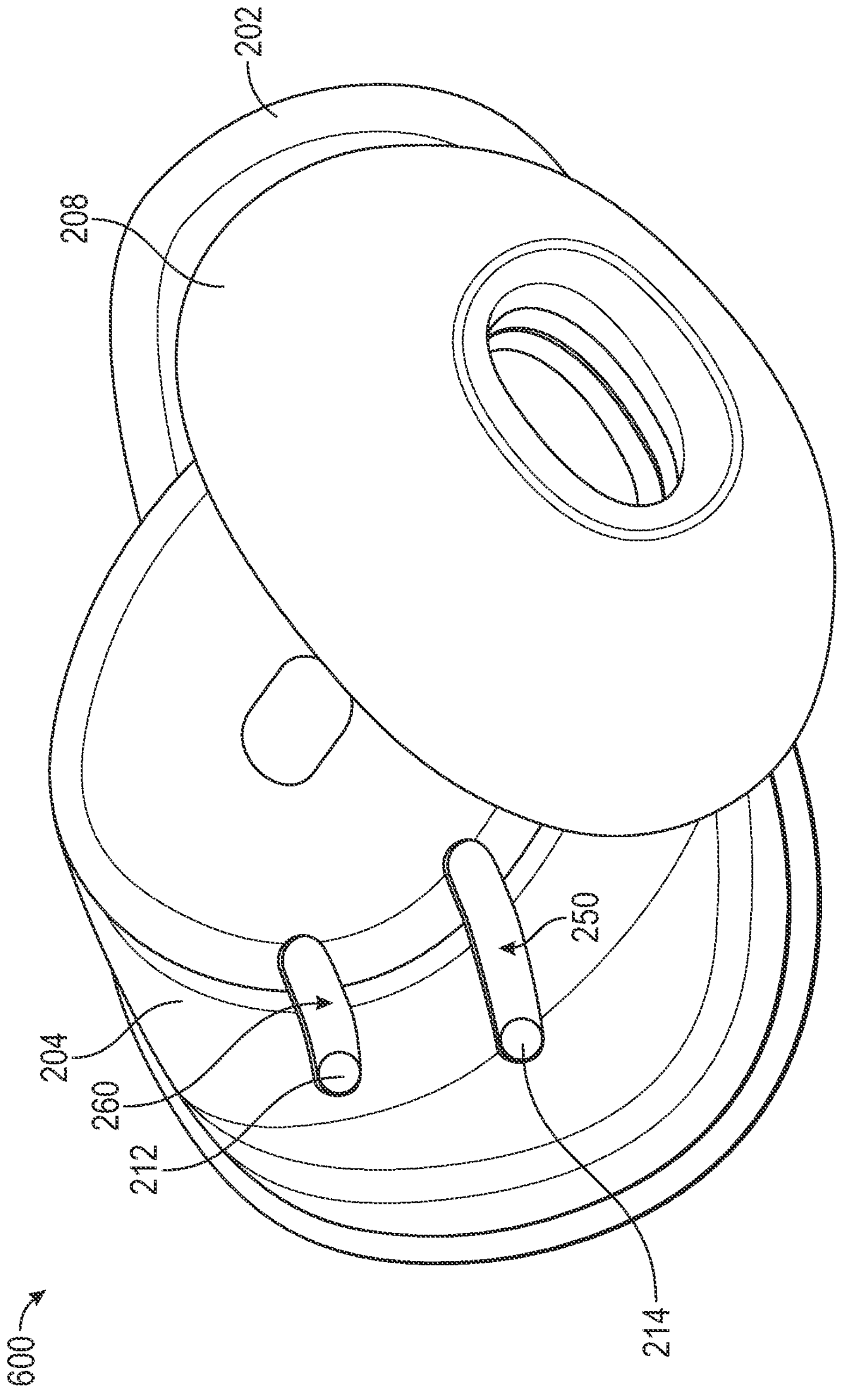
FIG. 6 illustrates is an in-ear audio output device having air flow relief features, according to aspects of the present disclosure.

FIG. 4 is a view of the acoustic chamber 400, according to aspects of the present disclosure. The housing 204 is removed to illustrate the electronics in the acoustic chamber of the device. Few locations exist for positioning the feedforward microphone (disposed in the port 214) and the mass port 212 given the particular geometry of the body needed to comfortably fit in-ear, size of the acoustic chamber, shape of the half-tube 228 connected to the mass port 212, and the many components housed in the chamber. Therefore, the feedforward microphone port 214 and mass port 212 are disposed in a flat portion of the acoustic chamber that aligns with the concha cymba when the device is worn. The ports 212 and 214 are susceptible to undesired full blockage based on the orientation of the ports on the housing 204 and ear geometry.

FIG. 5, FIG. 6, FIG. 7, and FIG. 8 illustrate different views 500, 600, and 700, 800 of an in-ear audio output device having air flow relief features, according to aspects of the present disclosure. The air flow relief features make a full blockage of the ports 212 and 214 highly unlikely, as explained below, while maintaining the location of the ports 212 and 214 and the overall design, shape, and fit of the housing 204 in a wearer's ear.

An air flow channel 250 extends from an area surrounding the feedforward microphone port 214 to a portion of the device that is shaped to fit deeper in the wearer's ear. In aspects, an air flow channel 260 extends from an area surrounding the mass port 212 to a portion of the device that is shaped to file deeper in the wearer's ear. Due to ear geometry, the air flow channel 250 and 260 are each shaped to cross over the helix crus 142 when positioned in-ear.

A stadium-shaped groove on the exterior surface of the housing 204 defines each air flow channel. The airflow channels extend from an area of the housing configured to be aligned with the concha cymba 132 to an area of the housing aligned with the concha cavum 134. In aspects, the depth of the air flow channel is constant relative to the exterior surface of the housing. The depth of the air flow channel is deep enough so that ear material will not deform to cause a full blockage of air flow. The depth of the air flow channel is shallow enough so that the walls of the air flow channel will not deform and cause a blockage of the air flow relief channel. In an example, the air flow channels are approximately 0.44 mm deep relative to the surface of the housing. In an example, the distance between the two substantially parallel walls is approximately 1.2 mm and the radius of the semicircles at each end of the air flow channel is approximately 0.6 mm (or ½ the distance between the walls). The length of the air flow channels is approximately 6.1 mm and approximately 4.66 mm from end to end. Accordingly, the length of the airflow channel from the end configured to sit in the concha cavum to the center of the port is approximately 5.5 mm (6.1 mm-0.6 mm) and 4.06 mm (4.66 mm-0.6 mm). All measurements have a tolerance of +/−0.10 mm.

Figure 7:
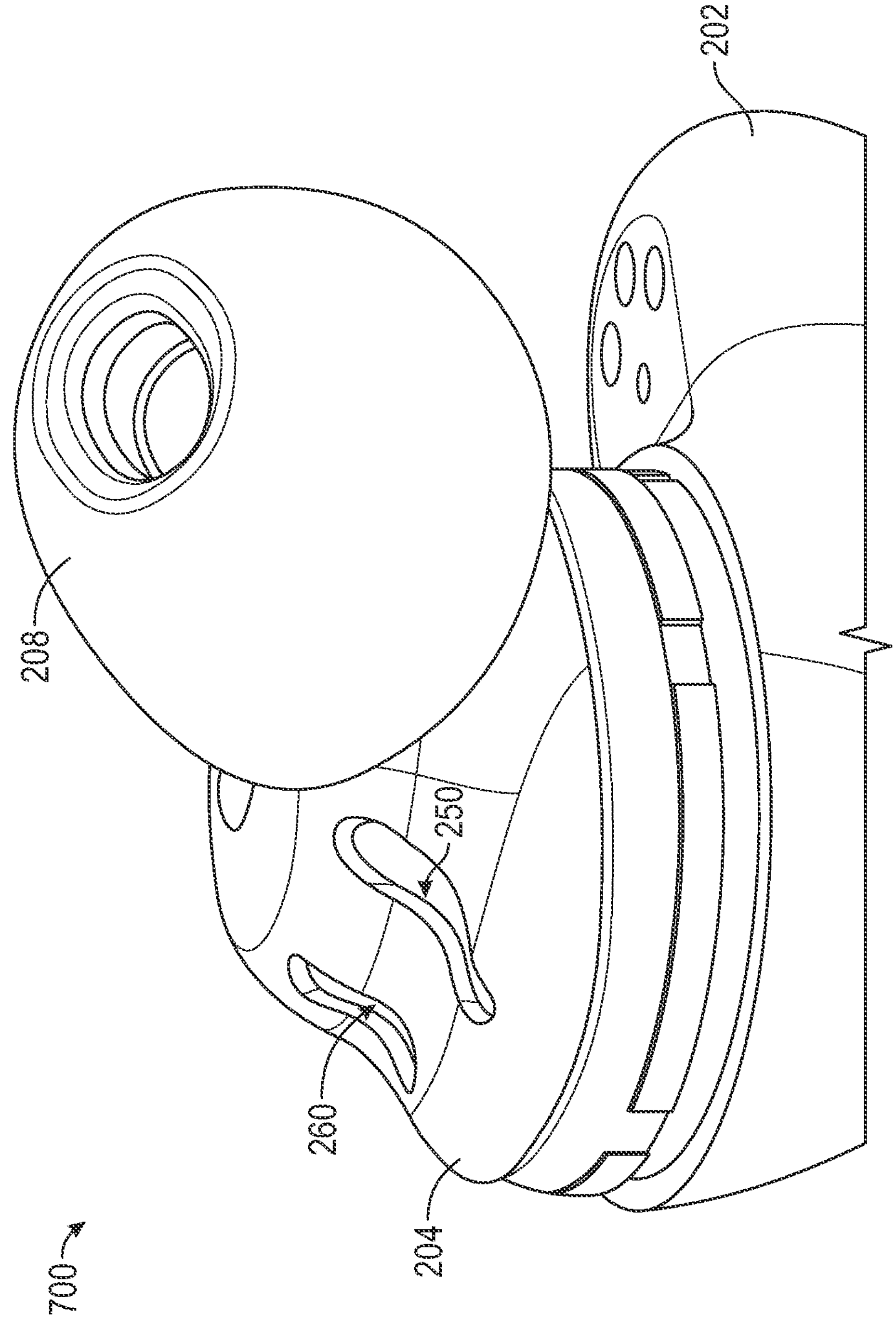
FIG. 7 is an in-ear audio output device having air flow relief features, according to aspects of the present disclosure.

In aspects, and as illustrated in FIGS. 5-8, the two air flow relief features are substantially parallel. They may be of equal or different lengths and depths. While two air flow channels are illustrated, in aspects of the present disclosure do not require a device to have both air flow channels. In FIG. 7, the ports are not visible from the perspective view because of the walls of the air flow channels.

When a device having air flow relief features 500, 600, 700, 800 is worn, the portion of the air flow channel 260 closest the mass port 212 is aligned with the concha cymba and the portion of the air flow channel 260 closest to the ear canal aligns with the concha cavum. Similarly, the portion of the air flow channel 250 closest the feedforward microphone port 214 is aligned with the concha cymba and the portion of the air flow channel 250 closest to the ear canal aligns with the concha cavum. Despite the air flow channels 250 and 260 having a continuous depth relative to an external surface of the housing, the air flow channels 250 and 260 each spans different planes. In other words, each air flow channel extends to the depth of the concha cymba in one portion and to the depth of the concha cavum in another portion. The likelihood of an air blockage between the device and ear across a vertical (longitudinal) direction of the stadium shape opening from the concha cymba 132 and over the helix crus 142 to the concha cavum 134 is unlikely. While partial blockages may occur along the air flow channels, given ear geometry, a seal along the entire air flow channel perimeter would be unlikely. Therefore, the ports 212 and 214 are less likely to experience a full blockage.

The in-ear audio output device described herein is applicable to a variety of devices, including audio headphones, hearing aids, hearing assistance headphones, noise-masking earbuds, ANR headphones, aviation headphones, audio eyeglasses, and other devices that include an in-ear component.

Numerous uses of and departures from the specific apparatus and techniques disclosed herein may be made without departing from the inventive concepts. Consequently, the invention is to be construed as embracing each and every novel feature and novel combination of features disclosed herein.

The invention claimed is:

1. An in-ear audio output device, comprising:
- an acoustic chamber defined by an earbud housing shaped to fit in a concha of an ear of a wearer of the in-ear audio output device, the earbud housing comprising:
- a first port configured to be aligned with a concha cymba of the wearer when the device is worn; and
- a first air flow channel extending from an area surrounding the first port to a portion of the earbud housing shaped to fit in a concha cavum of the wearer when the device is worn.

2. The in-ear audio output device of claim 1, wherein the first air flow channel comprises a geometric stadium shape.

3. The in-ear audio output device of claim 1, wherein the first air flow channel is shaped to cross a helix crus of the ear when the device is worn.

4. The in-ear audio output device of claim 1, wherein the first air flow channel has a continuous depth relative to an outer surface of the earbud housing.

5. The in-ear audio output device of claim 1, wherein the first port comprises a sound port, and further comprising:
- a feedforward microphone disposed in the sound port.

6. The in-ear audio output device of claim 1, further comprising:
- a second port configured to be aligned with the concha cymba of the wearer when the device is worn; and
- a second air flow channel extending from an area surrounding the second port to a portion of the earbud housing shaped to fit in the concha cavum of the wearer when the device is worn.

7. The in-ear audio output device of claim 6, wherein the second air flow channel comprises a geometric stadium shape.

8. The in-ear audio output device of claim 6, wherein the second air flow channel is shaped to cross a helix crus of the ear when the device is worn.

9. The in-ear audio output device of claim 6, wherein the second air flow channel has a continuous depth relative to an outer surface of the earbud housing.

10. The in-ear audio output device of claim 6, wherein the second port comprises a mass port.

11. The in-ear audio output device of claim 6, wherein the first air flow channel and the second air flow channel are substantially parallel.

12. An in-ear audio output device, comprising:

an acoustic chamber defined by an earbud housing shaped to fit in a concha of an ear of a wearer of the in-ear audio output device, the earbud housing comprising:

a feedforward microphone disposed in a sound port, the sound port configured to be aligned with a concha cymba of the wearer when the device is worn;

a mass port configured to be aligned with the concha cymba of the wearer when the device is worn; and a first air flow channel extending from a first portion of the housing surrounding the sound port to a second portion of the housing, the second portion of the housing being deeper within the ear and closer to an ear canal opening of the ear as compared to the first portion of the earbud housing.

13. The in-ear audio output device of claim 12, wherein, to extend from the first portion of the housing to the second portion of the housing, the first air flow channel is configured to cross over a helix crus of the ear when the device is worn.

14. The in-ear audio output device of claim 12, wherein the second portion of the housing is shaped to fit in a concha cavum of the concha.

15. The in-ear audio output device of claim 12, further comprising:

a second air flow channel extending from the first portion of the earbud housing surrounding the mass port to the second portion of the housing.

16. The in-ear audio output device of claim 15, wherein, to extend from the first portion of the housing to the second portion of the housing, the second air flow channel is configured to cross over a helix crus of the ear when the device is worn.

17. The in-ear audio output device of claim 15, wherein the first air flow channel and the second air flow channel each comprise a geometric stadium shape.

18. The in-ear audio output device of claim 15, wherein at least one of the first air flow channel or the second air flow channel has a continuous depth relative to an outer surface of the earbud housing.

19. The in-ear audio output device of claim 12, further comprising:

a resistive port configured to be aligned with an intertragal notch of the ear when the device is worn.

20. The in-ear audio output device of claim 19, wherein the resistive port creates an opening in a surface of the earbud housing to couple the acoustic chamber with a space outside of the earbud housing.

* * * * *